(12) United States Patent
Sakakibara et al.

(10) Patent No.: US 12,516,392 B2
(45) Date of Patent: Jan. 6, 2026

(54) HOT-ROLLED STEEL SHEET

(71) Applicant: NIPPON STEEL CORPORATION, Tokyo (JP)

(72) Inventors: Mutsumi Sakakibara, Tokyo (JP); Hiroshi Shuto, Tokyo (JP); Hiroshi Tanei, Tokyo (JP); Takaaki Tsutsumi, Tokyo (JP); Shota Ishitsuka, Tokyo (JP); Shinsuke Kai, Tokyo (JP); Akifumi Sakakibara, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 657 days.

(21) Appl. No.: 17/907,897

(22) PCT Filed: Mar. 8, 2021

(86) PCT No.: PCT/JP2021/008970
§ 371 (c)(1),
(2) Date: Aug. 29, 2022

(87) PCT Pub. No.: WO2021/182389
PCT Pub. Date: Sep. 16, 2021

(65) Prior Publication Data
US 2023/0349017 A1    Nov. 2, 2023

(30) Foreign Application Priority Data

Mar. 11, 2020  (JP) ................. 2020-041811

(51) Int. Cl.
| | | |
|---|---|---|
| *C21D 8/02* | (2006.01) | |
| *C21D 9/46* | (2006.01) | |
| *C22C 38/00* | (2006.01) | |
| *C22C 38/02* | (2006.01) | |
| *C22C 38/06* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *C22C 38/54* | (2006.01) | |
| *C22C 38/58* | (2006.01) | |

(52) U.S. Cl.
CPC ............. *C21D 8/0226* (2013.01); *C21D 9/46* (2013.01); *C22C 38/001* (2013.01); *C22C 38/002* (2013.01); *C22C 38/005* (2013.01); *C22C 38/02* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C21D 2211/001* (2013.01); *C21D 2211/002* (2013.01); *C21D 2211/005* (2013.01); *C21D 2211/008* (2013.01); *C21D 2211/009* (2013.01)

(58) Field of Classification Search
None
See application file for complete search history.

(56) References Cited

U.S. PATENT DOCUMENTS

2017/0130292 A1*  5/2017  Mohanty .................. C21D 1/25
2018/0010220 A1   1/2018  Allain et al.

FOREIGN PATENT DOCUMENTS

| CN | 106282762 A | 1/2017 |
|---|---|---|
| JP | 2012-172203 A | 9/2012 |
| JP | 2015-196891 A | 11/2015 |

* cited by examiner

*Primary Examiner* — Xiaowei Su
(74) *Attorney, Agent, or Firm* — Birch, Stewart, Kolasch & Birch, LLP

(57) ABSTRACT

This hot-rolled steel sheet has a predetermined chemical composition, the number % of crystal grains of bainite that are in contact with both tempered martensite and residual austenite is 80% or more of all crystal grains of the bainite, a C concentration in the residual austenite is 0.80 mass % or more, an average crystal grain size of the residual austenite is 0.70 μm or less, and a standard deviation of Vickers hardness is 25 HV0.01 or less.

4 Claims, No Drawings

HOT-ROLLED STEEL SHEET

TECHNICAL FIELD OF THE INVENTION

The present invention relates to a hot-rolled steel sheet. Priority is claimed on Japanese Patent Application No. 2020-041811, filed on Mar. 11, 2020, the content of which is incorporated herein by reference.

RELATED ART

From the viewpoint of protecting the global environment, weight reduction in vehicle bodies is underway for the purpose of improvement in the fuel efficiency of vehicles. In order to further reduce the weights of vehicle bodies, it is necessary to increase the strengths of steel sheets that are applied to vehicle bodies. However, in general, the high-strengthening of steel sheets degrades the formability, particularly, uniform elongation (ductility) which is important for drawing forming or bulge forming.

As a method for improving the uniform elongation, there is a method in which residual austenite is contained in the microstructure of a steel sheet. However, when residual austenite is contained in the microstructure of the steel sheet, the local deformability deteriorates. When performing bending forming, hole expanding process, and burring process, as the local deformability, in particular, excellent local ductility is required.

Patent Document 1 discloses a hot-rolled steel sheet having excellent local deformability and excellent ductility having formability that is less dependent on orientation and a manufacturing method thereof. The present inventors have found that the hot-rolled steel sheet described in Patent Document 1 contains a large amount of ferrite and thus has excellent ductility, but the local ductility may become insufficient.

PRIOR ART DOCUMENT

Patent Document

[Patent Document 1] Japanese Unexamined Patent Application, First Publication No. 2012-172203

DISCLOSURE OF THE INVENTION

Problems to be Solved by the Invention

An object of the present invention is to provide a hot-rolled steel sheet having excellent strength, ductility and local ductility. In addition, more preferably, an object of the present invention is to provide a hot-rolled steel sheet having the above-described various properties and, furthermore, excellent local bendability.

Means for Solving the Problem

In view of the above problems, the present inventors obtained the following findings (a) to (d) as a result of intensive studies on the chemical composition of the hot-rolled steel sheet and a relationship between a microstructure and mechanical properties, and completed the present invention.

(a) In order to obtain excellent strength, it is necessary to incorporate a desired amount of tempered martensite and bainite in the microstructure.

(b) In order to obtain excellent ductility, it is necessary to incorporate a desired amount of residual austenite in the microstructure. However, the incorporation of residual austenite degrades the local ductility of the hot-rolled steel sheet.

(c) In order to obtain excellent local ductility with incorporating residual austenite, it is necessary to control the C concentration in the residual austenite, the average grain size of the residual austenite, the number % of the crystal grains of the bainite that are in contact with both the tempered martensite and the residual austenite, and the standard deviation of Vickers hardness within desired ranges.

(d) In order to obtain excellent local bendability, it is necessary to control the maximum height roughness Rz of the surface of the hot-rolled steel sheet.

The gist of the present invention made based on the above findings is as follows.

(1) A hot-rolled steel sheet according to an aspect of the present invention includes, as a chemical composition, by mass %:
C: 0.100% to 0.350%,
Si: 1.00% to 3.00%,
Mn: 1.00% to 4.00%,
sol. Al: 0.001% to 2.000%,
P: 0.100% or less,
S: 0.0300% or less,
N: 0.1000% or less,
O: 0.0100% or less,
Ti: 0% to 0.300%,
Nb: 0% to 0.100%,
V: 0% to 0.500%,
Cu: 0% to 2.00%,
Cr: 0% to 2.00%,
Mo: 0% to 1.00%,
Ni: 0% to 2.00%,
B: 0% to 0.0100%,
Ca: 0% to 0.0200%,
Mg: 0% to 0.0200%,
REM: 0% to 0.1000%,
Bi: 0% to 0.020%,
one or two or more of Zr, Co, Zn, and W: 0% to 1.00% in total,
Sn: 0% to 0.050%, and
a remainder consisting of Fe and impurities,
in which a microstructure consists of, by area %,
bainite: 40% to 92%,
tempered martensite: 5% to 40%,
residual austenite: 3% to 20%,
ferrite: 5% or less,
fresh martensite: 5% or less, and
pearlite: 5% or less,
the number % of crystal grains of the bainite that are in contact with both the tempered martensite and the residual austenite is 80% or more of all crystal grains of the bainite,
a C concentration in the residual austenite is 0.80 mass % or more,
an average crystal grain size of the residual austenite is 0.70 µm or less, and
a standard deviation of Vickers hardness is 25 HV0.01 or less.

(2) The hot-rolled steel sheet according to (1) may have a maximum height roughness Rz of a surface of 15.0 µm or less.

(3) The hot-rolled steel sheet according to (1) or (2) may further include, as the chemical composition, by mass %, one or two or more selected from a group consisting of Ti: 0.005% to 0.300%,
Nb: 0.005% to 0.100%,
V: 0.005% to 0.500%,
Cu: 0.01% to 2.00%,
Cr: 0.01% to 2.00%,
Mo: 0.01% to 1.00%,
Ni: 0.02% to 2.00%,
B: 0.0001% to 0.0100%,
Ca: 0.0005% to 0.0200%,
Mg: 0.0005% to 0.0200%,
REM: 0.0005% to 0.1000%, and
Bi: 0.0005% to 0.020%.

Effects of the Invention

According to the above aspect of the present invention, it is possible to provide a hot-rolled steel sheet having excellent strength, ductility, and local ductility. In addition, according to the preferable aspect of the present invention, it is possible is to provide a hot-rolled steel sheet having the above-described various properties and, furthermore, excellent local bendability.

EMBODIMENTS OF THE INVENTION

The chemical composition and microstructure (metallographic structure) of a hot-rolled steel sheet according to the present embodiment (hereinafter, sometimes simply referred to as the steel sheet) will be more specifically described below. However, the present invention is not limited only to a configuration disclosed in the present embodiment, and various modifications can be made without departing from the scope of the gist of the present invention.

The numerical limit range described below with "to" in between includes the lower limit and the upper limit. Regarding the numerical value indicated by "less than" or "more than", the value does not fall within the numerical range. In the following description, % regarding the chemical composition of the steel sheet is mass % unless particularly otherwise specified.

Chemical Composition

The hot-rolled steel sheet according to the present embodiment includes, by mass %, C: 0.100% to 0.350%, Si: 1.00% to 3.00%, Mn: 1.00% to 4.00%, sol. Al: 0.001% to 2.000%, P: 0.100% or less, S: 0.0300% or less, N: 0.1000% or less, O: 0.0100% or less, and a remainder consisting of Fe and impurities. Each element will be described in detail below.

C: 0.100% to 0.350%

C is an element required to obtain a desired strength. When the C content is less than 0.100%, it is difficult to obtain a desired strength. Therefore, the C content is set to 0.100% or more. The C content is preferably 0.120% or more or 0.150% or more.

On the other hand, when the C content is more than 0.350%, the transformation rate becomes slow, which makes it easy for MA (a mixed phase of martensite and residual austenite) to be formed. As a result, it is not possible to obtain a structure having a uniform strength, and it becomes difficult to obtain excellent local ductility. Therefore, the C content is set to 0.350% or less. The C content is preferably 0.330% or less and 0.310% or less.

Si: 1.00% to 3.00%

Si has an action of delaying the precipitation of cementite. This action makes it possible to increase an amount of austenite remaining untransformed, that is, an area fraction of residual austenite. In addition, this action makes it possible to maintain a large amount of solid solution C in a hard phase and prevent the coarsening of cementite and consequently makes it possible to increase the strength of the steel sheet. In addition, Si itself has an effect on an increase in the strength of the hot-rolled steel sheet by solid solution strengthening. In addition, Si has an action of making steel sound by deoxidation (suppressing the occurrence of a defect such as a blowhole in steel). When the Si content is less than 1.00%, an effect by the action cannot be obtained. Therefore, the Si content is set to 1.00% or more. The Si content is preferably 1.20% or more or 1.50% or more. However, when the Si content is more than 3.00%, the precipitation of cementite is significantly delayed, and the area ratio of residual austenite excessively increases, which is not preferable. In addition, when the Si content is more than 3.00%, the surface properties, the chemical convertibility, the ductility and the weldability of the hot-rolled steel sheet are significantly deteriorated, and the $A_3$ transformation point is significantly increased. Therefore, it may become difficult to perform hot rolling in a stable manner. Therefore, the Si content is set to 3.00% or less. The Si content is preferably 2.70% or less or 2.50% or less.

Mn: 1.00% to 4.00%

Mn has an action of suppressing ferritic transformation to achieve the high-strengthening of the hot-rolled steel sheet. When the Mn content is less than 1.00%, a desired tensile strength cannot be obtained. Therefore, the Mn content is set to 1.00% or more. The Mn content is preferably 1.50% or more or 1.80% or more. On the other hand, when the Mn content is more than 4.00%, the local ductility of the hot-rolled steel sheet deteriorates. Therefore, the Mn content is set to 4.00% or less. The Mn content is preferably 3.70% or less or 3.50% or less.

sol. Al: 0.001% to 2.000%,

Similar to Si, sol. Al has an action of making the steel sheet sound by deoxidizing steel and promoting the formation of residual austenite by suppressing the precipitation of cementite from austenite. When the sol. Al content is less than 0.001%, an effect by the action cannot be obtained. Therefore, the sol. Al content is set to 0.001% or more. The sol. Al content is preferably 0.010% or more. On the other hand, when the sol. Al content is more than 2.000%, the above effects are saturated, which is not economically preferable. Furthermore, when the sol. Al content is more than 2.000%, the $A_3$ transformation point significantly increases, and it becomes difficult to stably perform hot rolling. Therefore, the sol. Al content is set to 2.000% or less. The sol. Al content is preferably 1.500% or less or 1.300% or less.

The sol. Al in the present embodiment means acid-soluble Al and refers to solid solution Al present in steel in a solid solution state.

P: 0.100% or Less

P is an element that is generally contained as an impurity, but has an action of increasing the strength of the hot-rolled steel sheet by solid solution strengthening. Therefore, P may be positively contained. However, P is also an element that is easily segregated. When the P content exceeds 0.100%, the deterioration of ductility becomes significant due to boundary segregation. Therefore, the P content is set to 0.100% or less. The P content is preferably 0.030% or less. The lower limit of the P content does not need to be particularly specified, but is preferably set to 0.001% or more from the viewpoint of the refining cost.

S: 0.0300% or Less

S is an element that is contained as an impurity and forms a sulfide-based inclusions in steel to degrade the ductility of the hot-rolled steel sheet. When the S content is more than 0.0300%, the ductility of the hot-rolled steel sheet significantly deteriorates. Therefore, the S content is set to 0.0300% or less. The S content is preferably 0.0050% or less. The lower limit of the S content does not need to be particularly specified, but is preferably set to 0.0001% or more from the viewpoint of the refining cost.

N: 0.1000% or Less

N is an element that is contained in steel as an impurity and has an action of degrading the ductility of the hot-rolled steel sheet. When the N content is more than 0.1000%, the ductility of the hot-rolled steel sheet significantly deteriorates. Therefore, the N content is set to 0.1000% or less. The N content is preferably 0.0800% or less or 0.0700% or less. Although the lower limit of the N content does not need to be particularly specified, as will be described later, in a case where one or two or more of Ti, Nb, and V are contained to refine the microstructure, the N content is preferably set to 0.0010% or more and more preferably set to 0.0020% or more to promote the precipitation of a carbonitrides.

O: 0.0100% or less

When a large amount of O is contained in steel, O forms a coarse oxide that becomes the origin of fracture and causes brittle fracture and hydrogen-induced cracks. Therefore, the O content is set to 0.0100% or less. The O content is preferably 0.0080% or less or 0.0050% or less. The O content may be set to 0.0005% or more or 0.0010% or more to disperse a large number of fine oxides when molten steel is deoxidized.

The remainder of the chemical composition of the hot-rolled steel sheet according to the present embodiment consists of Fe and impurities. In the present embodiment, the impurities mean elements that are incorporated from ore as a raw material, scrap, manufacturing environment, and the like or elements that are intentionally added in a small quantity and are allowed within a range that does not adversely affect the hot-rolled steel sheet according to the present embodiment.

The hot-rolled steel sheet according to the present embodiment may contain the following elements as optional elements in addition to the above elements. In a case where the above optional elements are not contained, the lower limit of the content thereof is 0%. Hereinafter, each optional element will be described in detail.

Ti: 0.005% to 0.300%, Nb: 0.005% to 0.100%, and V: 0.005% to 0.500%

Since all of Ti, Nb, and V are precipitated as a carbide or a nitride in steel and have an action of refining the microstructure by a pinning effect, one or two or more of these elements may be contained. In order to more reliably obtain the effect by the action, it is preferable that the Ti content is set to 0.005% or more, the Nb content is set to 0.005% or more, or the V content is set to 0.005% or more. However, even when these elements are excessively contained, the effect by the action is saturated, which is not economically preferable. Therefore, the Ti content is set to 0.300% or less, the Nb content is set to 0.100% or less, and the V content is set to 0.500% or less.

Cu: 0.01% to 2.00%, Cr: 0.01% to 2.00%, Mo: 0.01% to 1.00%, Ni: 0.02% to 2.00%, and B: 0.0001% to 0.0100%

All of Cu, Cr, Mo, Ni, and B have an action of enhancing the hardenability of the steel sheet. In addition, Cr and Ni have an action of stabilizing residual austenite, and Cu and Mo have an action of precipitating carbides in steel to increase the strength of the hot-rolled steel sheet. Furthermore, in a case where Cu is contained, Ni has an action of effectively suppressing the grain boundary cracking of a slab caused by Cu. Therefore, one or two or more of these elements may be contained.

Cu has an action of enhancing the hardenability of the steel sheet and an action of being precipitated as a carbide in steel at a low temperature to increase the strength of the hot-rolled steel sheet. In order to more reliably obtain the effect by the action, the Cu content is preferably set to 0.01% or more and more preferably set to 0.05% or more. However, when the Cu content is more than 2.00%, grain boundary cracking may occur in the slab in some cases. Therefore, the Cu content is set to 2.00% or less. The Cu content is preferably 1.50% or less or 1.00% or less.

As described above, Cr has an action of enhancing the hardenability of the steel sheet and an action of stabilizing residual austenite. In order to more reliably obtain the effect by the action, the Cr content is preferably set to 0.01% or more or 0.05% or more. However, when the Cr content is more than 2.00%, the chemical convertibility of the hot-rolled steel sheet significantly deteriorates. Therefore, the Cr content is set to 2.00% or less.

As described above, Mo has an action of enhancing the hardenability of the steel sheet and an action of precipitating carbides in steel to increase the strength. In order to more reliably obtain the effect by the action, the Mo content is preferably set to 0.01% or more or 0.02% or more. However, even when the Mo content is set to more than 1.00%, the effect by the action is saturated, which is not economically preferable. Therefore, the Mo content is set to 1.00% or less. The Mo content is preferably 0.50% or less and 0.20% or less.

As described above, Ni has an action of enhancing the hardenability of the steel sheet. In addition, when Cu is contained, Ni has an action of effectively suppressing the grain boundary cracking of the slab caused by Cu. In order to more reliably obtain the effect by the action, the Ni content is preferably set to 0.02% or more. Since Ni is an expensive element, it is not economically preferable to contain a large amount of Ni. Therefore, the Ni content is set to 2.00% or less.

As described above, B has an action of enhancing the hardenability of the steel sheet. In order to more reliably obtain the effect by the action, the B content is preferably set to 0.0001% or more or 0.0002% or more. However, when the B content is more than 0.0100%, the ductility of the hot-rolled steel sheet significantly deteriorates, and thus the B content is set to 0.0100% or less. The B content is preferably 0.0050% or less.

Ca: 0.0005% to 0.0200%, Mg: 0.0005% to 0.0200%, REM: 0.0005% to 0.1000%, and Bi: 0.0005% to 0.020%

All of Ca, Mg, and REM have an action of enhancing the formability of the hot-rolled steel sheet by adjusting the shape of inclusions to a preferable shape. In addition, Bi has an action of enhancing the formability of the hot-rolled steel sheet by refining the solidification structure. Therefore, one or two or more of these elements may be contained. In order to more reliably obtain the effect by the action, it is preferable that any one or more of Ca, Mg, REM, and Bi is set to 0.0005% or more. However, when the Ca content or Mg content is more than 0.0200% or when the REM content is more than 0.1000%, inclusions are excessively formed in steel, and thus the ductility of the hot-rolled steel sheet may be conversely degraded in some cases. In addition, even when the Bi content is set to more than 0.020%, the above effect by the action is saturated, which is not economically preferable. Therefore, the Ca content and the Mg content are set to 0.0200% or less, the REM content is set to 0.1000% or less, and the Bi content is set to 0.020% or less. The Bi content is preferably 0.010% or less.

Here, REM refers to a total of 17 elements consisting of Sc, Y, and lanthanoids, and the REM content refers to a total amount of these elements. In the case of the lanthanoids, the lanthanoids are industrially added in the form of misch metal.

One or Two or More of Zr, Co, Zn, or W: 0% to 1.00% in Total and Sn: 0% to 0.050%

Regarding Zr, Co, Zn, and W, the present inventors have confirmed that, even when a total of 1.00% or less of these elements are contained, the effect of the hot-rolled steel sheet according to the present embodiment is not impaired. Therefore, one or two or more of Zr, Co, Zn, or W may be contained in a total of 1.00% or less.

In addition, the present inventors have confirmed that, even when a small amount of Sn is contained, the effect of the hot-rolled steel sheet according to the present embodiment is not impaired; however a defect may occur during hot rolling, and thus the Sn content is set to 0.050% or less.

The chemical composition of the above hot-rolled steel sheet may be measured by a general analytical method. For example, inductively coupled plasma-atomic emission spectrometry (ICP-AES) may be used for measurement. sol. Al may be measured by the ICP-AES using a filtrate after a sample is decomposed with an acid by heating. C and S may be measured by using a combustion-infrared absorption method, N may be measured by using the inert gas melting-thermal conductivity method, and 0 may be measured using an inert gas melting-non-dispersive infrared absorption method.

Microstructure of Hot-Rolled Steel Sheet

Next, the microstructure of the hot-rolled steel sheet according to the present embodiment will be described.

In the hot-rolled steel sheet according to the present embodiment, the microstructure consists of, by area %, bainite: 40% to 92%, tempered martensite: 5% to 40%, residual austenite: 3% to 20%, ferrite: 5% or less, fresh martensite: 5% or less, and pearlite: 5% or less, the number % of crystal grains of the bainite that are in contact with both the tempered martensite and the residual austenite is 80% or more of all crystal grains of the bainite, the C concentration in the residual austenite is 0.80 mass % or more, the average crystal grain size of the residual austenite is 0.70 µm or less, and the standard deviation of Vickers hardness is 25 HV0.01 or less.

In the present embodiment, the microstructure is specified at a ¼ position of the sheet thickness from a surface and a center position in a sheet width direction in a sheet thickness cross section parallel to a rolling direction. The reason therefor is that the microstructure at this position indicates a typical microstructure of the hot-rolled steel sheet. The "¼ position" of the sheet thickness is an observation position for specifying the microstructure and is not strictly limited to a ¼ depth. A microstructure obtained by observing somewhere in a range of ⅛ to ⅜ depth of the sheet thickness can be regarded as the microstructure at the ¼ position.

Bainite: 40% To 92%

Bainite is a structure that improves the strength and ductility of the hot-rolled steel sheet. When the area ratio of the bainite is less than 40%, a desired strength and ductility cannot be obtained. Therefore, the area ratio of the bainite is set to 40% or more. The area ratio is preferably 50% or more, 55% or more, 65% or more, or 70% Of more.

On the other hand, when the area ratio of the bainite is more than 92%, a desired ductility cannot be obtained. Therefore, the area ratio of the bainite is set to 92% or less. The area ratio is preferably 90% or less or 85% or less.

Tempered Martensite: 5% To 40%

Tempered martensite is a structure that improves the strength of hot-rolled steel sheet. When the area ratio of the tempered martensite is less than 5%, a desired strength cannot be obtained. Therefore, the area ratio of the tempered martensite is set to 5% or more. The area ratio is preferably 10% or more or 15% or more.

On the other hand, when the area ratio of the tempered martensite exceeds 40%, a desired ductility cannot be obtained. Therefore, the area ratio of the tempered martensite is set to 40% or less. The area ratio is preferably 35% or less or 30% or less.

Residual Austenite: 3% To 20%

Residual austenite is a structure that improves the ductility of the hot-rolled steel sheet. When the area ratio of the residual austenite is less than 3%, a desired ductility cannot be obtained. Therefore, the area ratio of the residual austenite is set to 3% or more. The area ratio is preferably 5% or more, 7% or more, or 10% or more.

On the other hand, when the area ratio of the residual austenite exceeds 20%, a desired strength cannot be obtained. Therefore, the area ratio of the residual austenite is set to 20% or less. The area ratio is preferably 18% or less or 15% or less.

Ferrite: 5% or less

Since ferrite is a soft structure, when the area ratio of the ferrite is too large, a desired strength cannot be obtained. Therefore, the area ratio of the ferrite is set to 5% or less. The area ratio is preferably 4% or less, 3% or less, or 2% or less. Since the area ratio of the ferrite is preferably as small as possible, the area ratio of the ferrite may be 0%.

Fresh Martensite: 5% or Less Fresh martensite is a hard structure and thus contributes to improvement in the strength of the hot-rolled steel sheet. However, the fresh martensite has poor ductility and, furthermore, is a structure that degrades the local ductility. When the area ratio of the fresh martensite is too large, desired ductility and local ductility cannot be obtained. Therefore, the area ratio of the fresh martensite is set to 5% or less. The area ratio is preferably 4% or less, 3% or less, or 2% or less. Since the area ratio of the fresh martensite is preferably as small as possible, the area ratio of the fresh martensite may be 0%.

Pearlite: 5% or Less

When the area ratio of the pearlite is too large, the amount of the residual austenite decrease, and it may not be possible to secure a sufficient amount of the crystal grains of bainite that are in contact with both the tempered martensite and the residual austenite. Therefore, the area ratio of the pearlite is set to 5% or less. The area ratio is preferably 4% or less, 3% or less, or 2% or less. Since the area ratio of the pearlite is preferably as small as possible, the area ratio of the pearlite may be 0%.

The number % of the crystal grains of the bainite that are in contact with both the tempered martensite and the residual austenite is 80% or more of all crystal grains of the bainite.

The present inventors have found that, when 80% or more of the crystal grains of the bainite, by number %, of all of the crystal grains of the bainite are in contact with both the tempered martensite and the residual austenite, the local ductility of the hot-rolled steel sheet is improved. The present inventors presume mechanism thereof as follows.

When the residual austenite and the tempered martensite are in contact with each other, in the interface between the residual austenite and the tempered martensite, stress concentrates at the tempered martensite during distortion due to the hardness difference between the soft residual austenite and the full hard tempered martensite. As a result, voids are likely to be formed in the interface between the tempered martensite and the residual austenite. The voids formed in the interface between the tempered martensite and the residual austenite cause deterioration of the local ductility of the hot-rolled steel sheet. Therefore, when 80% or more of the crystal grains of bainite, by number %, of all of the crystal grains of the bainite are made to be in contact with both the tempered martensite and the residual austenite, stress concentration is less likely to occur during distortion at the tempered martensite. As a result, it is possible to improve the local ductility of the hot-rolled steel sheet.

When the number % of the crystal grains of the bainite that are in contact with both the tempered martensite and the residual austenite is less than 80% of all of the crystal grains of the bainite, it is not possible to improve the local ductility of the hot-rolled steel sheet. Therefore, the number % of the crystal grains of the bainite that are in contact with both the tempered martensite and the residual austenite is set to 80% or more of all of the crystal grains of the bainite. The number % is preferably 83% or more, 85% or more, or 87% or more. The upper limit of the number % of the crystal grains of the bainite that are in contact with both the tempered martensite and the residual austenite does not need to be particularly specified and may be 100%, 99%, or 98%.

Among the crystal grains of the bainite, crystal grains other than the crystal grains of the bainite that are in contact with both the tempered martensite and the residual austenite are the crystal grains of the bainite that are not in contact with the tempered martensite but are in contact with only the residual austenite, the crystal grains of the bainite that are in contact with both the tempered martensite and the pearlite.

Among the above individual structures, the area ratios of the structures other than the residual austenite are measured by the following method.

First, a test piece is sampled from the hot-rolled steel sheet so that the microstructure can be observed at the ¼ position of the sheet thickness from the surface and the center position in the sheet width direction of a sheet thickness cross section parallel to the rolling direction. Next, the sheet thickness cross section is polished, then, the polished surface is Nital-etched, and the structures of at least three 30 µm×30 µm regions are observed using an optical microscope and a scanning electron microscope (SEM). Image analysis is performed on the structure photographs obtained by this structure observation, thereby obtaining the area ratio of each of the ferrite, the pearlite, the bainite and the tempered martensite. After that, the same observation positions are LePera-corroded, then, the structures are observed using an optical microscope and a scanning electron microscope, and image analysis is performed on the obtained structure photographs, thereby calculating the area ratio of the fresh martensite.

In the above structure observation, each structure is identified by the following method.

A structure that is an aggregate of lath-shaped crystal grains and contains Fe-based carbides having a major axis of 20 nm or more and extending in different directions in the structure is regarded as the tempered martensite. Depending on the heat treatment conditions, a plurality of types of Fe-based carbides may be present in the tempered martensite.

Since the fresh martensite is a structure having a high dislocation density and having a substructure called a block or a packet in the grain, it is possible to distinguish the fresh martensite from other microstructures in an electron channeling contrast image for which a scanning electron microscope is used.

Among structures that are each an aggregate of lath-shaped crystal grains and do not contain any Fe-based carbides having a major axis of 20 nm or more in the structure, a structure that is not the fresh martensite or a structure in which Fe-based carbides having a major axis of 20 nm or more are contained in the structure and the Fe-based carbides have a single variant, that is, the Fe-based carbides extending in the same direction, is regarded as the bainite. Here, the Fe-based carbides extending in the same direction refer to Fe-based carbides for which the difference in the extending direction between the Fe-based carbides is 5° or less.

A structure that is lumpy crystal grains and does not contain any substructures such as a lath in the structure is regarded as the ferrite.

A structure in which sheet-shaped ferrite and an Fe-based carbide are overlapped in layers is regarded as the pearlite.

The number % of the crystal grains of the bainite that are in contact with both the tempered martensite and the residual austenite is obtained by performing the following measurement on the same region as the region observed with the above optical microscope and scanning electron microscope.

The sheet thickness cross section is polished using #600 to #1500 silicon carbide paper and then mirror-finished using a liquid containing a diamond powder having particle sizes of 1 to 6 µm dispersed in a diluted solution such as an alcohol or pure water. Next, strain introduced into the surface layer of the sample is removed by electrolytic polishing. In a random position of the sample cross section in a longitudinal direction, a region with a length of 50 µm and between a depth of ⅛ of the sheet thickness from the surface to a depth of ⅜ of the sheet thickness from the surface is measured by electron backscatter diffraction at a measurement interval of 0.1 µm to obtain crystal orientation information. For the measurement, an EBSD analyzer configured of a thermal field emission scanning electron microscope (JSM-7001F manufactured by JEOL) and an EBSD detector (DVC5 type detector manufactured by TSL) is used. At this time, the degree of vacuum inside the EBSD analyzer is set to $9.6 \times 10^{-5}$ Pa or less, the acceleration voltage is set to 15 kV, the irradiation current level is set to 13, and the electron beam irradiation level is set to 62.

The presence position of the residual austenite is confirmed using the obtained crystal orientation information and a "Phase Map" function installed in the software "OIM Analysis (registered trademark)" attached to the EBSD analysis device. A structure having an fcc crystal structure is determined as the residual austenite.

The number of the crystal grains of the bainite in the observation region and the number of the crystal grains of the bainite that are in contact with both the tempered martensite and the residual austenite are counted. The number of the crystal grains of the bainite that are in contact with both the tempered martensite and the residual austenite is divided by the number of all of the crystal grains of the bainite, thereby obtaining the number % of the crystal grains of the bainite that are in contact with both the tempered martensite and the residual austenite.

The presence positions of the tempered martensite and the bainite are confirmed by structure observation with the above optical microscope and scanning electron microscope, and the presence positions of the residual austenite is confirmed by observation by the above EBSD analysis. In addition, bainite surrounded by grain boundaries having an average crystal orientation difference of 15° or more is regarded as one crystal grain of the bainite. The grain boundaries having an average crystal orientation difference of 15° or more can be specified using the crystal orientation information obtained by EBSD analysis and an "Image Quality" function installed in the software "OIM Analysis (registered trademark)" attached to the EBSD analysis device.

The area ratio of the residual austenite is measured by the following method.

In the present embodiment, the area ratio of the residual austenite is measured by X-ray diffraction. First, the integrated intensity of a total of 6 peaks of α (110), α (200), α (211), γ (111), γ (200), and γ (220) is obtained using Co-Kα rays at the ¼ position of the sheet thickness and the center position in the sheet width direction of the sheet thickness cross section parallel to the rolling direction of the hot-rolled steel sheet and calculation is performed using a strength averaging method. Therefore, the area ratio of the residual austenite is obtained.

C Concentration in Residual Austenite: 0.80 Mass % or More

When the C concentration (carbon concentration) in the residual austenite is less than 0.80 mass %, a large amount of the residual austenite transforms into martensite in the early stage of distortion and, additionally, acts as hard martensite in the subsequent distortion and thus degrades the local ductility. When the C concentration in the residual austenite is set to 0.80 mass % or more, the residual austenite is appropriately stabilized, it is possible to retain the residual austenite until a high strain region in the late stage of distortion, and consequently, the local ductility of the hot-rolled steel sheet can be improved. Therefore, the C concentration in the residual austenite is set to 0.80 mass % or more. The C concentration in the residual austenite is more preferably 0.90 mass % or more, 1.00 mass % or more, or 1.20 mass % or more.

In addition, when the C concentration in the residual austenite is set to 2.00 mass % or less, excessive stabilization of the residual austenite is suppressed, and it is possible to more reliably develop transformation-induced plasticity (TRIP). Therefore, the C concentration in the residual austenite may be set to 2.00 mass % or less.

The C concentration in the residual austenite is obtained by X-ray diffraction. Specifically, X-ray diffraction with Cu-Kα rays is performed on the microstructure at the ¼ position of the sheet thickness from the surface of the steel sheet and the center position in the sheet width direction in the sheet thickness cross section parallel to the rolling direction, the lattice constant a (unit: angstrom) is obtained from the reflection angles of the (200) plane, (220) plane, and (311) plane of the residual austenite, and the C concentration (Cγ) in the residual austenite is calculated according to the following formula (A). Therefore, the C concentration (mass %) in the residual austenite is obtained.

$$C\gamma = (a - 3.572)/0.033 \tag{A}$$

Average Crystal Grain Size of Residual Austenite: 0.70 μm or Less

The size of the residual austenite significantly affects the stability of the residual austenite. When the average crystal grain size of the residual austenite is more than 0.70 μm, the residual austenite is not uniformly dispersed in steel, and it is not possible to effectively exhibit the TRIP effect of the residual austenite. As a result, the local ductility of the hot-rolled steel sheet cannot be improved. Therefore, the average crystal grain size of the residual austenite is set to 0.70 μm or less. The average crystal grain size is preferably 0.60 μm or less or 0.50 μm or less. The average crystal grain size of the residual austenite may be set to 0.10 μm or more.

The average crystal grain size of the residual austenite is measured by the following method.

A test piece is sampled from the hot-rolled steel sheet so that the microstructure can be observed at a ¼ position of the sheet thickness from the surface and a center position in the sheet width direction of a sheet thickness cross section parallel to the rolling direction.

A cross section of the test piece is polished using #600 to #1500 silicon carbide paper and then minor-finished using a liquid containing a diamond powder having particle sizes of 1 to 6 μm dispersed in a diluted solution such as an alcohol or pure water. Next, strain introduced into the surface layer of the sample is removed by electrolytic polishing. In a random position of the sample cross section in a longitudinal direction, a region with a length of 50 μm and between a depth of ⅛ of the sheet thickness from the surface to a depth of ⅜ of the sheet thickness from the surface is measured by electron backscatter diffraction at a measurement interval of 0.1 μm to obtain crystal orientation information. For the measurement, an EBSD analyzer configured of a thermal field emission scanning electron microscope (JSM-7001F manufactured by JEOL) and an EBSD detector (DVC5 type detector manufactured by TSL) is used. At this time, the degree of vacuum inside the EBSD analyzer is set to $9.6 \times 10^{-5}$ Pa or less, the acceleration voltage is set to 15 kV, the irradiation current level is set to 13, and the electron beam irradiation level is set to 62.

The average crystal grain size of the residual austenite is calculated using the obtained crystal orientation information and a "Phase Map" function installed in the software "OIM Analysis (registered trademark)" attached to the EBSD analysis device. A structure having an fcc crystal structure is determined as the residual austenite, and the equivalent circle diameter of each residual austenite is calculated, thereby obtaining the crystal grain size of each residual austenite. The average value of the crystal grain sizes of the residual austenite in the observation region is calculated, thereby obtaining the average crystal grain size of the residual austenite.

Standard Deviation of Vickers Hardness: 25 HV0.01 or Less

When the standard deviation of Vickers hardness is more than 25 HV0.01, since the hardness difference between the structures is large, it is not possible to improve the local ductility of the hot-rolled steel sheet. Therefore, the standard deviation of Vickers hardness is set to 25 HV0.01 or less. The standard deviation is preferably 23 HV0.01 or less, 20 HV0.01 or less, or 18 HV0.01 or less.

The standard deviation of Vickers hardness may be set to 1 HV0.01 or more.

The standard deviation of Vickers hardness is preferably as small as possible from the viewpoint of improving the local ductility of the hot-rolled steel sheet. That is, when the tempered martensite having large hardness is sufficiently softened in the hot-rolled steel sheet, it is possible to decrease the standard deviation of Vickers hardness.

The standard deviation of Vickers hardness is obtained by the following method.

In the microstructure at the center position in the sheet width direction on a sheet thickness cross section parallel to the rolling direction, Vickers hardness is measured at equal intervals at 300 or more measurement points within a range of the sheet thickness×1 mm. The measured load is set to 10 gf. Based on the measurement results, the standard deviation of Vickers hardness (HV0.01) is calculated.

Maximum Height Roughness Rz: 15.0 μm or Less

The maximum height roughness Rz of the surface of the hot-rolled steel sheet may be 15.0 μm or less. When the maximum height roughness Rz of the surface is set to 15.0 μm or less, it is possible to improve the local bendability. The maximum height roughness Rz of the surface is preferably 14.0 μm or less or 13.0 μm or less. The lower limit of the maximum height roughness Rz of the surface is not particularly limited, but may be 1.0 μm or more.

The maximum height roughness Rz is obtained by performing measurement according to JIS B 0601:2013.

Mechanical Properties

In the hot-rolled steel sheet according to the present embodiment, the tensile (maximum) strength may be 1180 MPa or more. When the tensile strength is set to 1180 MPa or more, a contribution can be further made to vehicle body weight reduction. The upper limit of the tensile strength does not need to be particularly limited and may be 1500 MPa or less.

In addition, in the hot-rolled steel sheet according to the present embodiment, the total elongation may be set to 10.0% or more, and the product (TS×l-El) of the tensile strength TS and the local elongation l-El may be set to 8400 MPa % or more. The upper limit of the total elongation may be set to 30.0% or less, and the upper limit of TS×l-El may be set to 15000 MPa % or less.

The tensile strength, the total elongation, and the local elongation are measured according to JIS Z 2241:2011 using a No. 5 test piece of JIS Z 2241:2011. The sampling position of a tensile test piece may be a ¼ portion from the end portion in the sheet width direction, and the tensile test piece may be sampled so that a direction perpendicular to the rolling direction becomes the longitudinal direction.

Sheet Thickness

The sheet thickness of the hot-rolled steel sheet according to the present embodiment is not particularly limited and may be 0.5 to 8.0 mm By setting the sheet thickness of the hot-rolled steel sheet to 0.5 mm or more, it becomes easy to secure the rolling completion temperature, and the rolling force can be reduced, and thus it is possible to easily perform hot rolling. Therefore, the sheet thickness of the hot-rolled steel sheet according to the present embodiment may be set to 0.5 mm or more. The sheet thickness is preferably 1.2 mm or more and 1.4 mm or more. In addition, when the sheet thickness is set to 8.0 mm or less, the refinement of the microstructure becomes easy, and the above-described microstructure can be easily secured. Therefore, the sheet thickness may be set to 8.0 mm or less. The sheet thickness is preferably 6.0 mm or less.

Plating Layer

The hot-rolled steel sheet according to the present embodiment having the above-described chemical composition and microstructure may be a surface-treated steel sheet provided with a plating layer on the surface for the purpose of improving corrosion resistance and the like. The plating layer may be an electro plating layer or a hot-dip plating layer. Examples of the electro plating layer include electrogalvanizing, electro Zn—Ni alloy plating, and the like. Examples of the hot-dip plating layer include hot-dip galvanizing, hot-dip galvannealing, hot-dip aluminum plating, hot-dip Zn—Al alloy plating, hot-dip Zn—Al—Mg alloy plating, hot-dip Zn—Al—Mg—Si alloy plating, and the like. The plating adhesion amount is not particularly limited and may be the same as before. Further, it is also possible to further enhance the corrosion resistance by performing an appropriate chemical conversion treatment (for example, the application and drying of a silicate-based chromium-free chemical conversion treatment liquid) after plating.

Manufacturing Conditions

In the suitable method for manufacturing the hot-rolled steel sheet according to the present embodiment, the following steps (1) to (6) are sequentially performed. The temperature of the slab and the temperature of the steel sheet in the present embodiment refer to the surface temperature of the slab and the surface temperature of the steel sheet. In the present embodiment, the temperature of the hot-rolled steel sheet is measured with a contact-type or non contact-type thermometer in the endmost portion in the sheet width direction. In portions other than the endmost portion of the hot-rolled steel sheet in the sheet width direction, the temperature is measured with a thermocouple or calculated by heat-transfer analysis.

(1) The slab is heated to 1100° C. or higher, retained, and then hot-rolled.
(2) Hot rolling is performed in a temperature range of 850° C. to 1100° C.
(3) The hot rolling is completed at 850° C. or higher.
(4) After the completion of the hot rolling, cooling is performed to a coiling temperature at an average cooling rate of 30° C./s or faster.
(5) The coiling temperature is set to a temperature range of T1–100° C. or higher and lower than T1 (° C.), and coiling is performed. In addition, the coiling tension at the time of the coiling is set to 3.6 kg/mm² or more. T1 (° C.) is represented by the following formula <1>.
(6) The average cooling rate in a temperature range of the coiling temperature to room temperature is set to 20° C./h or slower.

$$T1(°C.)=591-474\times[C]-33\times[Mn]-17\times[Ni]-17\times[Cr]-21\times[Mo]\ldots \quad <1>$$

However, the [element symbol] in each formula indicates the amount (mass %) of each element in the steel. When the element is not contained, substitution is performed with 0.

Slab Temperature when Subjected to Hot Rolling and Retention Time

As the slab to be subjected to hot rolling, a slab obtained by continuous casting, a slab obtained by casting and blooming, and the like can be used. If necessary, a slab obtained by additionally performing hot working or cold working on the above-described slab can be used.

The slab to be subjected to hot rolling is heated to 1100° C. or higher and retained in order to make the sizes of the crystal grains of the austenite uniform during slab heating.

The time during which the slab is retained at 1100° C. or higher (retention time) is preferably set to 6000 seconds or longer. The heating temperature of the slab is preferably set to 1300° C. or lower. In addition, when the heating temperature of the slab is set to 1170° C. or lower, it is possible to reduce the maximum height roughness Rz of the surface of the hot-rolled steel sheet. As a result, it is possible to improve the local bendability of the hot-rolled steel sheet. During retaining in the temperature range of 1100° C. or higher, the steel sheet temperature may be fluctuated or be maintained constant at 1100° C. or higher.

In hot rolling, it is preferable to use a reverse mill or a tandem mill for multi-pass rolling. Particularly, from the viewpoint of industrial productivity, it is more preferable that at least the final several stages are subjected to hot rolling using a tandem mill.

When hot rolling is performed in a temperature range of 850° C. to 1100° C., recrystallized austenite grains can be refined. It is preferable to perform the hot rolling in the temperature range of 850° C. to 1100° C. so that the sheet thickness is reduced by a total of 90% or more.

The sheet thickness reduction in a temperature range of 850° C. to 1100° C. can be expressed as $(t_0-t_1)/t_0 \times 100(\%)$ when an inlet sheet thickness before the first pass in the rolling in this temperature range is to and an outlet sheet thickness after the final pass in the rolling in this temperature range is $t_1$.

Hot Rolling Completion Temperature: 850° C. or Higher

The hot rolling completion temperature is preferably set to 850° C. or higher. By setting the hot rolling completion temperature to 850° C. or higher, it is possible to suppress an excessive increase in the number of ferrite nucleation sites in austenite. Furthermore, as a result, the formation of ferrite in the final structure (the microstructure of the manufactured hot-rolled steel sheet) is suppressed, and a high-strength hot-rolled steel sheet can be obtained. The upper limit of the hot rolling completion temperature is not particularly limited and may be set to 1100° C. or lower.

Cooling after Completion of Hot Rolling: Average Cooling Rate of 30° C./s or Faster In order to suppress the growth of austenite crystal grains refined by hot rolling, it is preferable to perform cooling to a temperature range of lower than T1 (° C.) at an average cooling rate of 30° C./s or faster after the completion of the hot rolling.

By performing cooling to a temperature range of lower than T1 (° C.) at an average cooling rate of 30° C./s or faster after the completion of the hot rolling, the formation of ferrite and pearlite can be suppressed. Accordingly, the strength of the hot-rolled steel sheet improves. The average cooling rate referred herein is a value obtained by dividing the temperature drop width of the steel sheet from the start of accelerated cooling (when introducing the steel sheet into cooling equipment) to the completion of accelerated cooling (when deriving the steel sheet from the cooling equipment) by the time required from the start of accelerated cooling to the completion of accelerated cooling. The upper limit of the average cooling rate is not particularly specified, but when the cooling rate is increased, the cooling equipment becomes large and the equipment cost increases. Therefore, considering the equipment cost, the average cooling rate is preferably 300° C./s or slower. In addition, the cooling stop temperature is preferably set to T1−100° C. or higher in consideration of the relationship with the coiling temperature described later.

Coiling Temperature: Temperature Range of T1−100° C. or Higher And Lower Than T1 (° C.)

The coiling temperature is set in a temperature range of T1−100° C. or higher and lower than T1 (° C.). By setting the coiling temperature to T1−100° C. or higher and lower than T1 (° C.), a desired amount of tempered martensite can be obtained, and as a result, it is possible to obtain a desired amount of the crystal grains of bainite that are in contact with both tempered martensite and residual austenite. In addition, residual austenite having a desired size can be obtained.

Coiling Tension: 3.6 kg/mm² or More

The steel sheet tension at the time of coiling (coiling tension) is set to 3.6 kg/mm² or more.

The coiling tension at the time of coiling is appropriately set depending on the target strength class and the target dimensions (sheet thickness and sheet width) of the steel sheet; however, in general, coiling is often performed with a coiling tension of 3.0 kg/mm² or less. However, the present inventors have found that, when a slab having the above chemical composition is hot-rolled under the above conditions and then coiled with a coiling tension at the time of coiling of 3.6 kg/mm² or more, it is possible to increase the number % of the crystal grains of the bainite that are in contact with both the tempered martensite and the residual austenite and to improve the local ductility of the hot-rolled steel sheet. This is considered to be because an increase in the coiling tension at the time of coiling causes strain between the tempered martensite and the untransformed austenite, and consequently, the formation of bainite at that position is promoted.

The upper limit of the coiling tension is not particularly specified and may be set to 5.0 kg/mm² or less from the viewpoint of suppressing an increase in the equipment load.

The coiling tension at the time of coiling may be controlled to be within a predetermined range by the output of a motor.

Cooling after Coiling: Average Cooling Rate within Temperature Range of Coiling Temperature to Room Temperature of 20° C./h or slower After the coiling, the average cooling rate within a temperature range of the coiling temperature to room temperature is set to 20° C./h or slower, it is possible to sufficiently soften the tempered martensite and to sufficiently reduce the hardness difference between the structures. On the other hand, when the average cooling rate after the coiling exceeds 20° C./h, it is not possible to sufficiently soften the tempered martensite, and the standard deviation of Vickers hardness may increase. Therefore, the average cooling rate within the temperature range of the coiling temperature to room temperature is set to 20° C./h or slower. In addition, when the average cooling rate within the temperature range of the coiling temperature to room temperature is set to 20° C./h or slower, it is possible to concentrate a sufficient amount of C in the residual austenite. As a result, the local ductility and ductility of the hot-rolled steel sheet can be improved.

The lower limit of the average cooling rate for the cooling after the coiling is not particularly specified and may be set to 5° C./h or faster. In addition, the average cooling rate after the coiling may be controlled with a heat insulating cover or an edge mask, by mist cooling, or the like.

EXAMPLES

Next, the effects of one aspect of the present invention will be described more specifically by way of examples, but the conditions in the examples are condition examples adopted for confirming the feasibility and effects of the present invention. The present invention is not limited to these condition examples. The present invention can employ various conditions as long as the object of the present invention is achieved without departing from the gist of the present invention.

Steels having chemical compositions shown in Tables 1 and 2 were melted and continuously cast to manufacture slabs having a thickness of 240 to 300 mm. The obtained slabs were used to obtain hot-rolled steel sheets shown in Table 4 under the manufacturing conditions shown in Table 3. Hot rolling was performed in a temperature range of 850° C. to 1100° C. so that the sheet thickness was reduced by a total of 90% or more.

For each of the obtained hot-rolled steel sheets, the area ratio of each structure, the number % of the crystal grains of bainite that were in contact with both tempered martensite and residual austenite, the C concentration in residual austenite, the average crystal grain size of the residual austenite, the standard deviation of Vickers hardness, and the maximum height roughness Rz of the surface were obtained by the above methods. The obtained measurement results are shown in Table 5.

Tensile Strength, Ductility and Local Ductility

A tensile test was performed according to JIS Z 2241: 2011. A test piece was a No. 5 test piece of JIS Z 2241:2011. The sampling position of the tensile test piece was a ¼ portion from the end portion in the sheet width direction, and the tensile test piece was sampled so that a direction perpendicular to a rolling direction became the longitudinal direction. With the tensile test piece, the tensile (maximum) strength, the total elongation, and the local elongation were obtained. The local elongation was defined as a value obtained by subtracting the uniform elongation from the total elongation.

When the tensile (maximum) strength was 1180 MPa or more, the hot-rolled steel sheet was determined as acceptable for having excellent strength, and, when the tensile (maximum) strength was less than 1180 MPa, the hot-rolled steel sheet was determined as unacceptable for not having excellent strength.

When the total elongation was 10.0% or more, the hot-rolled steel sheet was determined as acceptable for having excellent ductility, and, when the total elongation was less than 10.0%, the hot-rolled steel sheet was determined as unacceptable for not having excellent ductility.

In addition, when the product (TS×l-El) of the tensile strength TS and the local elongation l-El was 8400 MPa % or more, the hot-rolled steel sheet was determined as acceptable for having excellent local ductility, and, when TS×l-El was less than 8400 MPa %, the hot-rolled steel sheet was determined as unacceptable for not having excellent local ductility.

Local Bendability

The local bendability was evaluated by the following method.

A No. 1 test piece described in JIS Z 2204:2014 was prepared, and a V bending test was performed using the V block method described in JIS Z 2248:2014. The test piece was sampled so that a direction perpendicular to the rolling direction became the longitudinal direction (the bending ridge coincided with the rolling direction) and was bent so that the surface became the outside bend. The radius at the bottom part of the V block was changed from 1.0 mm to 6.0 mm in 0.5 mm increments, and the smallest radius at which cracking did not occur in the test piece was obtained as the limit bend radius R (mm). When a value R/t obtained by dividing the limit bend radius R (mm) by a test piece sheet thickness t (mm) was 1.6 or less, the hot-rolled steel sheet was determined as acceptable for having excellent local bendability.

The obtained measurement results are shown in Table 5.

TABLE 1

| | Mass %, remainder is Fe and impurities | | | | | | | | | | | | | | | | |
|---|---|---|---|---|---|---|---|---|---|---|---|---|---|---|---|---|---|
| Steel No. | C | Si | Mn | sol. Al | P | S | N | O | Ti | Nb | V | Cu | Cr | Mo | Ni | B | Note |
| A | 0.119 | 1.78 | 2.70 | 0.490 | 0.021 | 0.0019 | 0.0034 | 0.0038 | | | | | | | | | Invention Example |
| B | 0.221 | 2.23 | 2.61 | 0.033 | 0.020 | 0.0011 | 0.0026 | 0.0031 | | | | | | | | | Invention Example |
| C | 0.345 | 2.07 | 2.15 | 0.022 | 0.023 | 0.0020 | 0.0023 | 0.0033 | | | | | | | | | Invention Example |
| D | 0.224 | 1.18 | 2.07 | 0.024 | 0.019 | 0.0027 | 0.0031 | 0.0027 | | | | | | | | | Invention Example |
| E | 0.307 | 2.92 | 2.49 | 0.030 | 0.022 | 0.0011 | 0.0016 | 0.0016 | | | | | | | | | Invention Example |
| F | 0.254 | 1.63 | 1.38 | 0.016 | 0.021 | 0.0017 | 0.0038 | 0.0025 | | | | | | | | | Invention Example |
| G | 0.247 | 1.65 | 1.45 | 0.023 | 0.021 | 0.0033 | 0.0028 | 0.0046 | | | | | | | | | Invention Example |
| H | 0.290 | 1.02 | 2.51 | 1.310 | 0.016 | 0.0021 | 0.0033 | 0.0034 | | | | | | | | | Invention Example |
| I | 0.192 | 1.60 | 1.94 | 0.030 | 0.020 | 0.0012 | 0.0024 | 0.0023 | 0.156 | | | | | | | | Invention Example |
| J | 0.214 | 2.16 | 2.08 | 0.033 | 0.023 | 0.0025 | 0.0019 | 0.0022 | | 0.042 | | | | | | | Invention Example |
| K | 0.256 | 2.20 | 2.08 | 0.019 | 0.021 | 0.0027 | 0.0022 | 0.0051 | | | 0.034 | | | | | | Invention Example |
| L | 0.299 | 2.43 | 3.21 | 0.018 | 0.018 | 0.0030 | 0.0028 | 0.0042 | | | | 0.04 | | | | | Invention Example |
| M | 0.193 | 1.95 | 2.04 | 0.038 | 0.025 | 0.0025 | 0.0031 | 0.0054 | | | | | 0.42 | | | | Invention Example |

TABLE 1-continued

| Steel No. | Mass %, remainder is Fe and impurities | | | | | | | | | | | | | | | | Note |
|---|---|---|---|---|---|---|---|---|---|---|---|---|---|---|---|---|---|
| | C | Si | Mn | sol. Al | P | S | N | O | Ti | Nb | V | Cu | Cr | Mo | Ni | B | |
| N | 0.215 | 1.61 | 2.91 | 0.040 | 0.023 | 0.0031 | 0.0028 | 0.0030 | | | | | | 0.140 | | | Invention Example |
| O | 0.272 | 2.23 | 1.92 | 0.015 | 0.016 | 0.0035 | 0.0038 | 0.0047 | | | | | | | 0.19 | | Invention Example |
| P | 0.154 | 2.05 | 2.66 | 0.023 | 0.017 | 0.0024 | 0.0015 | 0.0032 | | | | | | | | 0.0025 | Invention Example |
| Q | <u>0.096</u> | 2.13 | 2.45 | 0.022 | 0.025 | 0.0029 | 0.0036 | 0.0037 | | | | | | | | | Comparative Example |
| R | <u>0.381</u> | 2.37 | 2.90 | 0.035 | 0.015 | 0.0018 | 0.0019 | 0.0043 | | | | | | | | | Comparative Example |
| S | 0.235 | <u>0.87</u> | 2.63 | 0.017 | 0.015 | 0.0036 | 0.0015 | 0.0015 | | | | | | | | | Comparative Example |
| T | 0.176 | 1.77 | <u>0.86</u> | 0.032 | 0.024 | 0.0011 | 0.0039 | 0.0034 | | | | | | | | | Comparative Example |
| U | 0.194 | 1.79 | <u>4.24</u> | 0.029 | 0.024 | 0.0029 | 0.0026 | 0.0039 | | | | | | | | | Comparative Example |

Underlines indicate that the corresponding values are outside the ranges of the present invention.

TABLE 2

| Steel No. | Mass %, remainder is Fe and impurities | | | | | | | | | T1 °C. | Note |
|---|---|---|---|---|---|---|---|---|---|---|---|
| | Ca | Mg | REM | Bi | Zr | Co | Zn | W | Sn | | |
| A | 0.0024 | 0.0017 | | | | | | | | 445 | Invention Example |
| B | | | | | | | | | | 400 | Invention Example |
| C | | | 0.0017 | | | | | | | 357 | Invention Example |
| D | | | | 0.003 | | | | | | 417 | Invention Example |
| E | | | | | | | | | | 363 | Invention Example |
| F | | | | | | | | | | 425 | Invention Example |
| G | | | | | | | | | | 426 | Invention Example |
| H | | | | | | | | | | 371 | Invention Example |
| I | | | | | 0.08 | | | | | 436 | Invention Example |
| J | | | | | | | | | | 421 | Invention Example |
| K | | | | | | | 0.03 | | | 401 | Invention Example |
| L | | | | | | 0.05 | | | | 343 | Invention Example |
| M | | | | | | | | | | 425 | Invention Example |
| N | | | | | | | | | 0.018 | 390 | Invention Example |
| O | | | | | | | | | | 395 | Invention Example |
| P | | | | | | | | 0.14 | | 430 | Invention Example |
| Q | | | | | | | | | | 465 | Comparative Example |
| R | | | | | | | | | | 315 | Comparative Example |
| S | | | | | | | | | | 393 | Comparative Example |
| T | | | | | | | | | | 479 | Comparative Example |
| U | | | | | | | | | | 359 | Comparative Example |

TABLE 3

| Manufacturing No. | Steel No. | Slab heating temperature ° C. | Hot rolling completion temperature ° C. | Average cooling rate until coiling ° C./s | T1 ° C. | T1 − 100 ° C. | Coiling temperature ° C. | Coiling tension kg/mm$^2$ | Average cooling rate after coiling ° C./h | Note |
|---|---|---|---|---|---|---|---|---|---|---|
| 1 | A | 1167 | 962 | 57 | 445 | 345 | 395 | 3.6 | 19 | Invention Example |
| 2 | B | 1221 | 1003 | 40 | 400 | 300 | 372 | 3.7 | 20 | Invention Example |
| 3 | B | 1165 | 892 | 56 | 400 | 300 | 381 | 3.9 | 15 | Invention Example |
| 4 | B | 1162 | <u>831</u> | 77 | 400 | 300 | 325 | 3.7 | 20 | Comparative Example |
| 5 | B | 1167 | 1003 | <u>21</u> | 400 | 300 | 365 | 3.6 | 20 | Comparative Example |
| 6 | B | 1164 | 944 | <u>65</u> | 400 | 300 | 421 | 3.6 | 19 | Comparative Example |
| 7 | B | 1168 | 881 | 48 | 400 | 300 | <u>254</u> | 3.7 | 15 | Comparative Example |
| 8 | B | 1165 | 867 | 87 | 400 | 300 | 355 | <u>2.4</u> | 19 | Comparative Example |
| 9 | B | 1166 | 896 | 41 | 400 | 300 | 342 | 3.8 | <u>50</u> | Comparative Example |
| 10 | B | 1167 | 861 | 35 | 400 | 300 | 379 | 3.6 | <u>25</u> | Comparative Example |
| 11 | C | 1165 | 992 | 47 | 357 | 257 | 325 | 4.1 | 19 | Invention Example |
| 12 | D | 1159 | 945 | 71 | 417 | 317 | 350 | 3.7 | 17 | Invention Example |
| 13 | E | 1167 | 965 | 68 | 363 | 263 | 338 | 4.2 | 17 | Invention Example |
| 14 | F | 1165 | 954 | 77 | 425 | 325 | 385 | 4.0 | 16 | Invention Example |
| 15 | G | 1164 | 962 | 77 | 426 | 326 | 398 | 4.0 | 15 | Invention Example |
| 16 | H | 1167 | 1030 | 84 | 371 | 271 | 351 | 4.1 | 20 | Invention Example |
| 17 | I | 1245 | 870 | 69 | 436 | 336 | 371 | 3.8 | 17 | Invention Example |
| 18 | J | 1238 | 961 | 52 | 421 | 321 | 397 | 4.0 | 16 | Invention Example |
| 19 | K | 1234 | 922 | 67 | 401 | 301 | 382 | 3.9 | 16 | Invention Example |
| 20 | L | 1225 | 943 | 94 | 343 | 243 | 304 | 3.8 | 20 | Invention Example |
| 21 | M | 1232 | 945 | 82 | 425 | 325 | 375 | 4.2 | 17 | Invention Example |
| 22 | N | 1232 | 967 | 75 | 390 | 290 | 336 | 3.7 | 20 | Invention Example |
| 23 | O | 1158 | 854 | 80 | 395 | 295 | 382 | 3.8 | 18 | Invention Example |
| 24 | P | 1211 | 865 | 49 | 430 | 330 | 399 | 3.7 | 20 | Invention Example |
| 25 | <u>Q</u> | 1164 | 872 | 54 | 465 | 365 | 421 | 4.0 | 19 | Comparative Example |
| 26 | <u>R</u> | 1167 | 890 | 82 | 315 | 215 | 285 | 3.8 | 17 | Comparative Example |
| 27 | <u>S</u> | 1168 | 948 | 67 | 393 | 293 | 335 | 4.1 | 17 | Comparative Example |
| 28 | <u>T</u> | 1169 | 978 | 89 | 479 | 379 | 420 | 3.7 | 16 | Comparative Example |
| 29 | <u>U</u> | 1165 | 977 | 79 | 359 | 259 | 342 | 3.9 | 17 | Comparative Example |

Underlines indicate that the manufacturing conditions are not preferable.

TABLE 4

| Manufacturing No. | Steel No. | Bainite area % | Tempered martensite area % | Residual austenite area % | Ferrite area % | Fresh martensite area % | Pearlite area % | Crystal grains of bainite in contact with both tempered martensite and residual austenite number % |
|---|---|---|---|---|---|---|---|---|
| 1 | A | 62 | 28 | 10 | 0 | 0 | 0 | 82 |
| 2 | B | 58 | 27 | 15 | 0 | 0 | 0 | 87 |
| 3 | B | 61 | 19 | 18 | 0 | 0 | 2 | 87 |
| 4 | B | 46 | 40 | 8 | <u>6</u> | 0 | 0 | 94 |
| <u>5</u> | B | <u>33</u> | 30 | 10 | <u>20</u> | 0 | <u>7</u> | <u>42</u> |
| <u>6</u> | B | <u>73</u> | 0 | <u>23</u> | 0 | 4 | 0 | <u>0</u> |
| <u>7</u> | B | <u>15</u> | <u>80</u> | <u>2</u> | 0 | 0 | 3 | <u>36</u> |
| <u>8</u> | B | <u>52</u> | <u>39</u> | <u>9</u> | 0 | 0 | 0 | <u>73</u> |
| <u>9</u> | B | 54 | 38 | 3 | 0 | 5 | 0 | <u>90</u> |
| <u>10</u> | B | 65 | 21 | 14 | 0 | 0 | 0 | 85 |
| <u>11</u> | C | 48 | 29 | 18 | 0 | 5 | 0 | 87 |
| 12 | D | 53 | 38 | 6 | 0 | 0 | 3 | 90 |
| 13 | E | 52 | 24 | 20 | 0 | 4 | 0 | 86 |
| 14 | F | 43 | 36 | 12 | 4 | 5 | 0 | 89 |
| 15 | G | 56 | 27 | 13 | 0 | 4 | 0 | 87 |
| 16 | H | 58 | 24 | 13 | 5 | 0 | 0 | 82 |
| 17 | I | 49 | 40 | 11 | 0 | 0 | 0 | 90 |
| 18 | J | 61 | 23 | 16 | 0 | 0 | 0 | 86 |
| 19 | K | 64 | 19 | 17 | 0 | 0 | 0 | 85 |
| 20 | L | 47 | 35 | 18 | 0 | 0 | 0 | 89 |
| 21 | M | 53 | 28 | 14 | 0 | 5 | 0 | 90 |
| 22 | N | 52 | 35 | 12 | 0 | 1 | 0 | 89 |
| 23 | O | 68 | 14 | 15 | 3 | 0 | 0 | 83 |
| 24 | P | 59 | 29 | 12 | 0 | 0 | 0 | 87 |
| <u>25</u> | <u>Q</u> | 47 | 38 | 5 | <u>10</u> | 0 | 0 | 90 |
| <u>26</u> | <u>R</u> | 45 | 28 | 20 | 0 | <u>7</u> | 0 | 87 |
| <u>27</u> | <u>S</u> | 45 | 38 | <u>2</u> | 0 | <u>3</u> | <u>12</u> | <u>25</u> |
| <u>28</u> | <u>T</u> | <u>38</u> | 36 | 3 | <u>23</u> | 0 | 0 | <u>42</u> |
| <u>29</u> | <u>U</u> | <u>58</u> | 17 | 15 | 0 | <u>10</u> | 0 | <u>36</u> |

TABLE 4-continued

| Manufacturing No. | C concentration in residual austenite mass % | Average crystal grain size of residual austenite μm | Standard deviation of Vickers hardness HV0.01 | Maximum height roughness Rz of surface μm | Sheet thickness mm | Note |
|---|---|---|---|---|---|---|
| 1 | 1.20 | 0.64 | 17 | 13.6 | 4.0 | Invention Example |
| 2 | 1.10 | 0.65 | 19 | 17.4 | 3.2 | Invention Example |
| 3 | 1.10 | 0.66 | 19 | 13.2 | 2.6 | Invention Example |
| 4 | 1.30 | 0.62 | 23 | 14.3 | 2.9 | Comparative Example |
| _5_ | 1.10 | 0.64 | _46_ | 14.2 | 2.6 | Comparative Example |
| _6_ | 0.90 | _1.10_ | _22_ | 12.9 | 2.9 | Comparative Example |
| _7_ | 1.40 | _0.54_ | 18 | 12.9 | 2.9 | Comparative Example |
| _8_ | 1.20 | 0.62 | 22 | 11.9 | 2.6 | Comparative Example |
| _9_ | _0.75_ | 0.62 | _51_ | 13.0 | 2.6 | Comparative Example |
| _10_ | _1.20_ | 0.66 | _32_ | 13.8 | 2.9 | Comparative Example |
| 11 | 1.20 | 0.64 | _24_ | 11.4 | 4.2 | Invention Example |
| 12 | 0.90 | 0.68 | 18 | 11.2 | 2.6 | Invention Example |
| 13 | 1.20 | 0.65 | 23 | 11.3 | 1.8 | Invention Example |
| 14 | 1.40 | 0.63 | 21 | 13.1 | 2.6 | Invention Example |
| 15 | 1.40 | 0.65 | 24 | 13.0 | 2.9 | Invention Example |
| 16 | 1.20 | 0.68 | 24 | 13.4 | 2.9 | Invention Example |
| 17 | 1.50 | 0.62 | 16 | 17.2 | 2.9 | Invention Example |
| 18 | 1.30 | 0.65 | 15 | 18.3 | 2.3 | Invention Example |
| 19 | 1.10 | 0.66 | 15 | 16.2 | 2.9 | Invention Example |
| 20 | 1.10 | 0.56 | 17 | 18.9 | 2.9 | Invention Example |
| 21 | 1.50 | 0.62 | 23 | 16.6 | 2.9 | Invention Example |
| 22 | 1.50 | 0.63 | 20 | 17.7 | 4.0 | Invention Example |
| 23 | 1.10 | 0.67 | 19 | 12.8 | 2.9 | Invention Example |
| 24 | 1.40 | 0.64 | 15 | 16.4 | 2.9 | Invention Example |
| _25_ | 1.10 | 0.62 | _32_ | 13.9 | 4.0 | Comparative Example |
| _26_ | 1.20 | 0.64 | _28_ | 11.9 | 2.9 | Comparative Example |
| _27_ | 1.30 | 0.62 | _34_ | 13.4 | 2.3 | Comparative Example |
| _28_ | 1.40 | 0.63 | _46_ | 13.7 | 2.9 | Comparative Example |
| _29_ | 1.40 | 0.67 | _59_ | 12.6 | 2.6 | Comparative Example |

Underlines indicate that the corresponding values are outside the ranges of the present invention or unpreferable property values.

TABLE 5

| Manufacturing No. | Steel No. | Tensile strength TS MPa | Total elongation El % | Local elongation l-El % | TS × El MPa · % | TS × l-El MPa · % | R/t — | Note |
|---|---|---|---|---|---|---|---|---|
| 1 | A | 1286 | 16.8 | 10.0 | 21605 | 12860 | 1.0 | Invention Example |
| 2 | B | 1299 | 16.2 | 8.2 | 21044 | 10652 | 1.9 | Invention Example |
| 3 | B | 1254 | 16.3 | 7.8 | 20440 | 9781 | 0.8 | Invention Example |
| _4_ | B | _1147_ | 18.4 | 9.6 | 21105 | 11011 | 1.4 | Comparative Example |
| _5_ | B | _1069_ | 20.1 | 7.2 | 23625 | _7697_ | 1.5 | Comparative Example |
| _6_ | B | _1178_ | 17.0 | 6.2 | 20026 | _7304_ | 1.4 | Comparative Example |
| _7_ | B | 1387 | _9.2_ | 5.4 | 12760 | _7490_ | 1.4 | Comparative Example |
| _8_ | B | 1248 | 14.8 | 6.5 | 18474 | _8114_ | 1.5 | Comparative Example |
| _9_ | B | 1274 | 13.5 | 5.3 | 17199 | _6752_ | 1.5 | Comparative Example |
| _10_ | B | 1236 | 14.6 | 5.8 | 18046 | _7169_ | 1.4 | Comparative Example |
| 11 | C | 1285 | 16.7 | 8.5 | 21460 | 10923 | 1.0 | Invention Example |
| 12 | D | 1221 | 13.4 | 7.4 | 16361 | 9035 | 1.5 | Invention Example |
| 13 | E | 1236 | 15.6 | 8.3 | 19282 | 10259 | 1.1 | Invention Example |
| 14 | F | 1182 | 14.2 | 7.8 | 16784 | 9220 | 1.5 | Invention Example |
| 15 | G | 1245 | 13.8 | 7.2 | 17181 | 8964 | 1.4 | Invention Example |
| 16 | H | 1184 | 14.5 | 7.2 | 17168 | 8525 | 1.4 | Invention Example |

TABLE 5-continued

| Manufacturing No. | Steel No. | Tensile strength TS MPa | Total elongation El % | Local elongation l-El % | TS × El MPa · % | TS × l-El MPa · % | R/t — | Note |
|---|---|---|---|---|---|---|---|---|
| 17 | I | 1267 | 14.2 | 7.8 | 17991 | 9883 | 2.1 | Invention Example |
| 18 | J | 1237 | 14.5 | 7.4 | 17937 | 9154 | 2.6 | Invention Example |
| 19 | K | 1208 | 14.5 | 7.2 | 17512 | 8696 | 2.1 | Invention Example |
| 20 | L | 1264 | 16.2 | 8.5 | 20477 | 10744 | 2.1 | Invention Example |
| 21 | M | 1225 | 17.3 | 8.6 | 21193 | 10535 | 2.1 | Invention Example |
| 22 | N | 1272 | 13.4 | 6.8 | 17045 | 8650 | 1.6 | Invention Example |
| 23 | O | 1197 | 18.2 | 9.3 | 21785 | 11132 | 1.4 | Invention Example |
| 24 | P | 1228 | 15.1 | 8.2 | 18543 | 10070 | 1.7 | Invention Example |
| <u>25</u> | Q | <u>892</u> | 22.3 | 10.2 | 19892 | 9098 | 1.0 | Comparative Example |
| <u>26</u> | R | 1242 | 14.2 | 6.3 | 17636 | <u>7825</u> | 1.4 | Comparative Example |
| <u>27</u> | S | 1246 | 10.3 | 6.7 | 12834 | 8348 | 1.5 | Comparative Example |
| <u>28</u> | T | <u>873</u> | 22.6 | 10.2 | 19730 | 8905 | 1.4 | Comparative Example |
| <u>29</u> | U | 1298 | 17.2 | 6.2 | 22326 | 8048 | 1.3 | Comparative Example |

Underlines indicate that the corresponding values are outside the ranges of the present invention or unpreferable property values.

As can be seen from Table 5, Manufacturing Nos. 1 to 3 and 11 to 24 according to Invention Example, hot-rolled steel sheets having excellent strength, ductility and local ductility were obtained. In addition, in Manufacturing Nos. 1, 3, 11 to 16, and 23 in which the maximum height roughness Rz of the surface was 15.0 μm or less, hot-rolled steel sheets having the above properties and, furthermore, excellent local bendability were obtained.

On the other hand, in Manufacturing Nos. 4 to 10 and 25 to 29 in which the chemical composition and/or the microstructure were not within the ranges specified by the present invention were poor in any one or more of the properties (tensile strength, ductility, and local ductility).

INDUSTRIAL APPLICABILITY

According to the above aspect of the present invention, it is possible to provide a hot-rolled steel sheet having excellent strength, ductility, and local ductility. In addition, according to the preferable aspect of the present invention, it is possible is to provide a hot-rolled steel sheet having the above-described various properties and, furthermore, excellent local bendability.

The hot-rolled steel sheet according to the present invention is suitable as an industrial material used for vehicle members, mechanical structural members, and building members.

The invention claimed is:
1. A hot-rolled steel sheet comprising, as a chemical composition, by mass %:
   C: 0.100% to 0.350%;
   Si: 1.00% to 3.00%;
   Mn: 1.00% to 4.00%;
   sol. Al: 0.001% to 2.000%;
   P: 0.100% or less;
   S: 0.0300% or less;
   N: 0.1000% or less;
   O: 0.0100% or less;
   Ti: 0% to 0.300%;
   Nb: 0% to 0.100%;
   V: 0% to 0.500%;
   Cu: 0% to 2.00%;
   Cr: 0% to 2.00%;
   Mo: 0% to 1.00%;
   Ni: 0% to 2.00%;
   B: 0% to 0.0100%;
   Ca: 0% to 0.0200%;
   Mg: 0% to 0.0200%;
   REM: 0% to 0.1000%;
   Bi: 0% to 0.020%;
   one or more of Zr, Co, Zn, and W: 0% to 1.00% in total,
   Sn: 0% to 0.050%; and
   a remainder comprising Fe and impurities,
   wherein a microstructure comprises, by area %,
   bainite: 40% to 92%;
   tempered martensite: 5% to 40%;
   residual austenite: 3% to 20%;
   ferrite: 5% or less;
   fresh martensite: 5% or less; and
   pearlite: 5% or less,
   the number % of crystal grains of the bainite that are in contact with both the tempered martensite and the residual austenite is 80% or more of all crystal grains of the bainite,
   a C concentration in the residual austenite is 0.80 mass % or more,
   an average crystal grain size of the residual austenite is 0.70 μm or less, and
   a standard deviation of Vickers hardness is 25 HV0.01 or less.
2. The hot-rolled steel sheet according to claim 1, wherein a maximum height roughness Rz of a surface, measured in accordance with JIS B 0601:2013, is 15.0 μm or less.

3. The hot-rolled steel sheet according to claim 1, further comprising, as the chemical composition, by mass %, one or more selected from:
Ti: 0.005% to 0.300%;
Nb: 0.005% to 0.100%;
V: 0.005% to 0.500%;
Cu: 0.01% to 2.00%;
Cr: 0.01% to 2.00%;
Mo: 0.01% to 1.00%;
Ni: 0.02% to 2.00%;
B: 0.0001% to 0.0100%;
Ca: 0.0005% to 0.0200%;
Mg: 0.0005% to 0.0200%;
REM: 0.0005% to 0.1000%; and
Bi: 0.0005% to 0.020%.

4. The hot-rolled steel sheet according to claim 2, further comprising, as the chemical composition, by mass %, one or more selected from:
Ti: 0.005% to 0.300%;
Nb: 0.005% to 0.100%;
V: 0.005% to 0.500%;
Cu: 0.01% to 2.00%;
Cr: 0.01% to 2.00%;
Mo: 0.01% to 1.00%;
Ni: 0.02% to 2.00%;
B: 0.0001% to 0.0100%;
Ca: 0.0005% to 0.0200%;
Mg: 0.0005% to 0.0200%;
REM: 0.0005% to 0.1000%; and
Bi: 0.0005% to 0.020%.

\* \* \* \* \*